Patented Nov. 4, 1947

2,430,039

UNITED STATES PATENT OFFICE 2,430,039

OIL BASE DRILLING FLUID

Francis M. Anderson, Duncan, Okla., assignor to Halliburton Oil Well Cementing Company, Duncan, Okla.

No Drawing. Application December 22, 1945, Serial No. 637,069

7 Claims. (Cl. 252—8.5)

This invention relates to oil base fluids suitable for use in drilling oil wells or the like and more particularly to compositions of matter suitable for use in drilling oil wells which pass through rock formations containing anhydrite (calcium sulfate) or other formations which have high calcium content.

In recent years various non-aqueous compositions of matter have been proposed for drilling oil wells. Oil base drilling fluids are now commercially used for that purpose. The oil base drilling fluids described and claimed in the patent to Dawson et al., No. 2,350,154, granted May 30, 1944, are particularly suitable for the drilling of oil wells. As disclosed in this patent, an alkali soap of tall oil is used in making certain oil base muds. Soaps of other higher polyolefinic carboxylic acids may be used.

The advantages in using oil base mud instead of water base mud are now well-recognized. However, when drilling through earth formations in which the calcium ion concentration is high, or when drilling out excessive Portland cement left in the well following a cementing operation, the calcium precipitates the soap normally used in the oil base drilling fluid, with the result that some of its desirable properties are destroyed.

It is an object of the present invention to devise an oil base drilling fluid suitable for use in drilling through anhydrite, Portland cement or other materials containing calcium or magnesium compounds, in which the soap in the drilling fluid is not materially precipitated by the calcium or magnesium.

In accordance with the invention, it has been discovered that if a small amount of sodium chloride brine is added to oil base drilling fluids such as those described in the Dawson patent referred to above, the soap precipitate does not form even though the mud becomes contaminated with anhydrite or Portland cement.

The reasons for the behavior of oil base mud containing a small amount of sodium chloride solution are not understood. The action is contrary to what would normally be expected in water solutions. The preferred formulas for oil base drilling fluids contain soap made by mixing tall oil and an alkali, such as sodium hydroxide or sodium silicate. If such an alkali tall oil soap per se, is mixed with a salt water solution and with calcium, a calcium soap precipitate is formed. Likewise, contamination of sodium oleate or any other common soap with salt water and calcium causes a precipitate to form. Similarly, contamination of alkali tall oil soap or sodium oleate with calcium without any salt solution being present, causes a calcium soap to precipitate. The reaction takes place even where the alkali soap is mixed with Diesel oil or other oil base materials in making an oil base mud.

Contrary to normal expectations, therefore, it has been discovered that when a sodium chloride solution is added to oil base mud containing tall oil soap, contamination of that mud with calcium does not cause the precipitate to form. Various theories have been advanced for this behavior, the most plausible of which seems to be that when an alkali metal chloride brine is added to the oil base mud and intimately mixed in with it, the salt concentration in the water phase of the mud reaches saturation and prevents the formation of the calcium soap.

Whatever the theory, the action of the salt solution in preventing the calcium precipitation of the tall oil soap has now been fully proven in the field, and its use in oil base mud has proven successful commercially.

In accordance with the invention, it is necessary to add only a small amount of sodium chloride brine to the mud. Preferably, the salt is dissolved in water until a saturated solution is obtained. Less than one per cent by volume of this saturated solution is sufficient if added to oil base mud of the type disclosed in the patent to Dawson, cited above, provided the mud is then mixed until the salt solution is thoroughly dispersed. In most oil base muds, the amount of saturated brine which will perform the function of preventing calcium from precipitating the soap, ranges from one-tenth per cent to one per cent. If the brine is not saturated, up to two per cent by volume performs the desired function, and more than two per cent is of no benefit.

Oil base mud treated with one per cent by volume of saturated brine suffers substantially no ill effects when contaminated with Portland cement slurry up to five per cent by weight, or with anhydrite up to ten per cent by weight. It has also been found that contamination of mud so treated with more sodium chloride, such as occurs when wells are drilled through salt domes, does not cause the precipitation of the soap as would normally be expected.

The formula for an oil base drilling fluid, which has been found to be particularly suitable for drilling through anhydrite formations in the Mid-Continent oil fields, is as follows:

| | | |
|---|---|---|
| Blend [1] | 38,570 gals. | |
| Sodium silicate | 13,200 lbs. | |
| Tall oil | 13,200 lbs. | 1,000 bbls. |
| Sodium hydroxide | 900 lbs. | |
| Saturated solution of sodium chloride in water | 1,050 lbs. | |

[1] *Diesel oil and air-blown asphalt blend.* The Diesel oil and asphalt should be blended together so that the asphalt shall comprise 15 to 25 per cent of the blend by weight.

The above formula gives the essential ingredients of the composition, but if the weight of the drilling fluid so made is not high enough to meet the requirements on any given well, the weight may be increased by adding pulverized limestone, ground oyster shells, barytes, iron oxide, galena, etc., in accordance with well-known practices.

Instead of the Diesel oil-asphalt blend given in the above formula, other oil base materials have been successfully used. Various crude oils, as well as kerosene, with or without asphalt therein, have met with some commercial success. In any case, the oil base material is mixed with an alkali metal soap, such as tall oil soap, until a reaction product or thin grease or grease-like mixture is obtained, and this mixture is then treated with the small percentage of an alkali metal chloride brine.

While only one specific formula for the composition of matter has been set forth herein, it will be obvious to those skilled in the art that the invention is not limited to the specific formula given. Laboratory experiments indicate that the invention may be practiced successfully in compositions in which all of the sodium hydroxide has been replaced by sodium silicate or in which the soap is made with sodium hydroxide alone. Likewise, instead of using sodium alkali and salt, as given in the specific examples above, other alkali metal salts, such as potassium chloride may be used. While only one formula has been given, it will be obvious therefore that many changes may be made without departing from the spirit of the invention or the scope of the annexed claims.

I claim:

1. A composition of matter for use in drilling wells comprising a thin grease made by mixing Diesel oil with an alkali metal tall oil soap to which saturated sodium chloride brine has been added in the amount of one-tenth per cent to one per cent by volume.

2. A composition of matter for use in drilling wells through material containing calcium or magnesium compounds, said matter consisting of the reaction product obtained by mixing Diesel oil, tall oil, sodium silicate, sodium hydroxide and blown asphalt, and sodium chloride brine, the amount of brine being between one-tenth per cent and two per cent by volume of the other constituents.

3. A composition of matter for use in drilling wells through material containing calcium or magnesium compounds, said matter consisting of the reaction product obtained by mixing Diesel oil, tall oil, sodium silicate, sodium hydroxide, blown asphalt, a weighting material and sodium chloride brine, the amount of brine being more than one-tenth per cent and less than two per cent by volume of the other constituents.

4. A composition of matter for use in drilling wells through material containing calcium or magnesium compounds, said matter consisting of a thin grease made by mixing an oil base with an alkali metal tall oil soap to which an alkali metal chloride brine has been added, the amount of brine being more than one-tenth per cent and less than two per cent by volume of the other constituents.

5. A composition of matter for use in drilling wells consisting of the reaction product obtained by mixing the following materials in substantially the following proportions: A blend of Diesel oil and asphalt, 38,570 gallons; sodium silicate, 13,200 pounds; tall oil, 13,200 pounds; sodium hydroxide, 900 pounds; and saturated solution of sodium chloride in water, 1,050 pounds.

6. A composition of matter for use in drilling wells through material containing calcium or magnesium compounds, said matter consisting of a thin grease made by mixing an oil base with an alkali soap of a high polyolefinic carboxylic acid to which an alkali metal chloride brine has been added, the amount of brine being more than one-tenth per cent and less than two per cent by volume of the other constituents.

7. A composition of matter for use in drilling wells consisting of a thin grease made by mixing an oil base with an alkali metal soap, to which an alkali metal chloride brine has been added, the amount of brine being more than one-tenth per cent and less than two per cent by volume of the other constituents.

FRANCIS M. ANDERSON.

REFERENCES CITED

The following references are of record in the file of this patent:

UNITED STATES PATENTS

| Number | Name | Date |
| --- | --- | --- |
| 2,073,413 | Cross et al. | Mar. 9, 1937 |
| 2,146,693 | Vietti et al. | Feb. 7, 1939 |
| 2,297,660 | Mazee | Sept. 29, 1942 |
| 2,350,154 | Dawson et al. | May 30, 1944 |
| 2,351,912 | Borglin | June 20, 1944 |